Jan. 24, 1967     A. M. ZARKHIN ETAL     3,300,046
DEVICE FOR GRADING LOOSE-MATERIAL GRANULES BY WEIGHT
Filed July 8, 1964                                      2 Sheets-Sheet 1
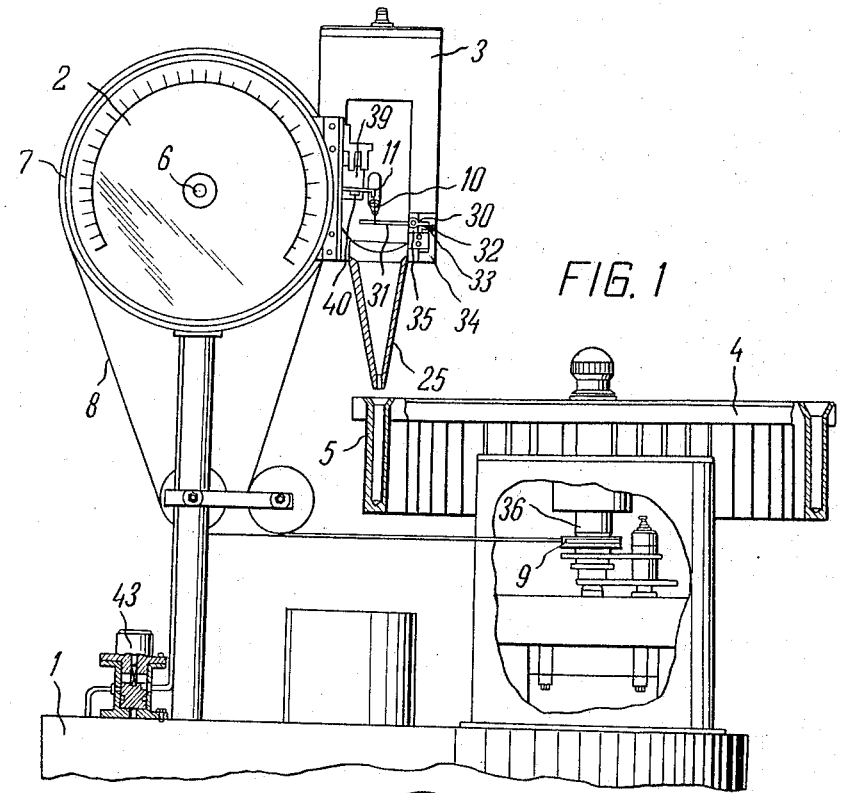

Jan. 24, 1967 A. M. ZARKHIN ETAL 3,300,046
DEVICE FOR GRADING LOOSE-MATERIAL GRANULES BY WEIGHT
Filed July 8, 1964 2 Sheets-Sheet 2
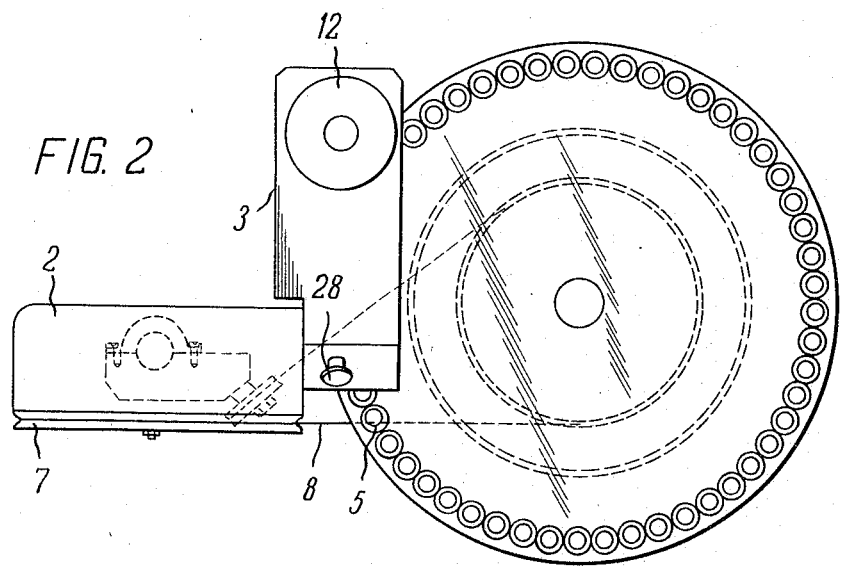
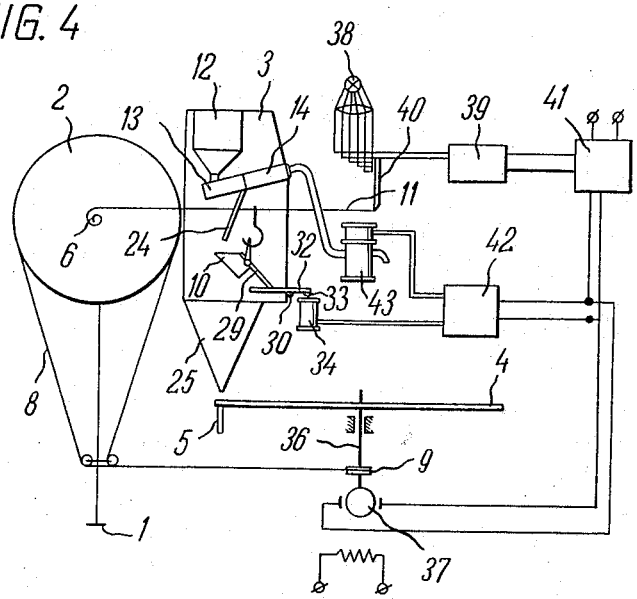

United States Patent Office 3,300,046
Patented Jan. 24, 1967

3,300,046
DEVICE FOR GRADING LOOSE-MATERIAL
GRANULES BY WEIGHT
Avraam Moiseevich Zarkhin and Galina Vasiljevna Judina, Moscow, U.S.S.R., assignors to Usesojuzny Nauchno-Issledovateljsky Institute Burovoi Tekhniki, Moscow, U.S.S.R.
Filed July 8, 1964, Ser. No. 381,266
4 Claims. (Cl. 209—121)

The present invention relates to devices for grading loose-material granules, mainly diamond granules, according to their weight.

At present, grading of diamond granules according to their weight is performed manually. Each granule is weighed with torsion or analytic balances and then is taken by hand from a pan and put into a corresponding compartment for granules of the same weight.

Diamond granules are of very small size, thus making grading thereof strenuous and time consuming. The accuracy of the weighing and the distributing of the granules into the compartments is therefore not high because the operators easily become tired.

An object of the present invention is to eliminate the above-mentioned disadvantages and to provide a granule weight-grading device which permits automatic and accurate weighing and distributing of granules into compartments in accordance with their weight.

This object is achieved according to the invention with the device for the grading of loose-material granules according to their weight, in which said device comprises a balance mainly of a torsional type, a feeder, for instance of a pneumatic type, intended for piecewise delivery of granules onto a balance pan, a table located under said feeder and intended to receive definite grades of granules, a device to control said feeder and the motion of the table through a preset angle depending upon the weight of a given granule.

The table for receiving definite grades of granules is made to swivel about the vertical and is provided with compartments arranged throughout its circumference so that they can move under the feeder funnel.

The feeder comprises a hopper for granules, said hopper being fixed within the housing of the device; a piston arranged in a chamber mounted in said housing, said piston having channels communicating with a vacuum system and designed for sucking-in and dropping down a granule as well as for raising the piston; a guide tray connected with the piston chamber for receiving the granule lifted by the piston, and for delivering it onto the balance plan; a knocking-off member for the removal of granules from the balance pan, said member comprising a lever interacting with the electromagnet connected to the electric circuit of the device to control the feeder and angular motion of the table; and a funnel located under the balance pan to direct the weighed granule into the respective compartment on the table.

The device for controlling the feeder and angular motion of the table is provided with a sensor located in the feeder housing close to the balance pan, said sensor being connected through an electronic amplifier to the electric circuit for reversing the electric motor of the table and energizing the pneumatic feeder and the electromagnet of the knocking-off member through a time relay. As the vertical shaft of the table is geared to the shaft of the balance, the table is turned through a preset angle depending on the weight of a granule. For a better understanding of the invention there is given below a description of the device with reference to the accompanying drawings, in which:

FIG. 1 is a side view of the device in partial section;
FIG. 2 is a top plan view of the device;
FIG. 3 is a longitudinal sectional view of the feeder without the knocking-off member;
FIG. 4 is a diagram of the device for controlling the feeder swivelling and the table.

The device comprises a balance 2 for weighing granules, a feeder 3 for piecewise delivery of the granules onto the balance, and a table 4 for receiving the weighed granules in respective cells or compartments therein the above three units being mounted on common bed 1.

Balance 2 of the device is of a torsional type, its shaft 6 having a disc 7 connected by a flexible rope 8 with a roller 9 of table 4. Table 4 receives weighed granules from a scoop-shaped pan 10 suspended on beam 11 of the balance.

Mounted on the side wall of the balance is the feeder 3 whose housing contains a hopper 12 for granules to be weighed. The feeder housing also has a chamber 13 with a piston slidable therein. The chamber is connected to a vacuum system through respective channels in the feeder housing and the piston body. For raising piston 14 under the effect of a vacuum, the housing of feeder 3 is provided with a channel 15 connected to chamber 13, while in the upper part of the piston there is a groove 16 preventing channel 15 from being closed by the piston in its top position.

Longitudinally extending in a side surface of the piston is a groove 17, communicating with internal space 18 of piston 14 and hole 19 in a peripheral part of the bottom of the piston for sucking grain 20. Arranged in said groove so as to occupy approximately half of its depth is the end of a pipe 21 connected with the vacuum system.

The feeder housing is also provided with a hole 22 through which chamber 13 communicates with the atmosphere.

In the side wall of the piston in its hollow part there is also a hole 23, which coincides with hole 22 in the chamber when the piston is in its top position, and connects internal space 18 of the piston with the atmosphere.

Feeder housing 3 is provided with a tray 24, one end of which is connected to the chamber at the level of hole 19 when piston 14 is in its top position and the other end is located over balance pan 10 under which funnel 25 is located. Chamber 13, containing the piston, is connected with the hopper through a channel 26. The chamber 13 is provided with plug 27 at one end while at the opposite end the chamber is closed with a plug 28.

Balance pan 10 is provided with a shank 29; the knocking-off member for throwing the granules off balance pan 10 comprises a two arm lever 31, mounted movably on axle 30 in the housing of feeder 3, and having on its short arm 32, a metal plate 33 arranged in front of an electromagnet 34.

Lever 31 rests upon a lug 35, fixed in the housing of feeder 3, and which is adapted to prevent said lever from turning over.

Swivel table 4 is mounted on a vertical shaft 36 and cells or compartments 5 thereof are in the shape of tubes arranged circumferentially for being moved under funnel 25 of the feeder.

Shaft 36 of table 4 is provided with the roller 9, connected with balance disc 7 by flexible rope 8, said disc beign fastened to shaft 6. The table is driven by electric motor 37 (FIG. 4).

The device for control of the feeder and angular motion of the table has a sensor mounted in the housing of feeder 3, close to balance pan 10, said sensor being connected to the electric power supply circuit for shaft 36 and comprising light-source 38, photo-sensitive cell 39 and screen 40 located therebetween, said screen being attached to balance beam 11.

The electric circuit contains a bridge system and electronic amplifier 41 to reverse electric motor 37, and a time relay 42 is connected to control valve 43, which is connected with the pneumatic feeder and electromagnet 34 of the knocking-off member.

The device operates as follows:

The granules to be graded are loaded into hopper 12 of feeder 3 from which they pass into chamber 13.

When electronic amplifier 41 is activated, the lamp of light source 38 is energized and through an optical system illuminates photo-cell 39.

When the system is in equilibrium, screen 40, fixed on beam 11 of the torsion balance blocks approximately half of the light rays coming to photo-cell 39.

The bridge system becomes balanced and the current fed to the reversible electric motor of table 4 drops to zero.

At that moment time relay 42 actuates electromagnet 34 of the knocking-off member which attracts short arm 32 of the lever. Long arm 31 of said lever strikes against shank 29 of balance pan 10, which is not filled yet with a granule.

In a few seconds, time relay 42 actuates for a short time, the electromagnet of control valve 43, which connects chamber 13 of pneumatic feeder 3 with the vacuum system. Internal space 18 of the piston is constantly connected with the vacuum system through pipe 21, thereby providing for a grain to be sucked against hole 19. Vacuum created in chamber 13, makes piston 14 rise to the level of tray 24. When the piston reaches its top position, hole 23 in the wall of said piston coincides with hole 22 in the feeder housing, thereby allowing the air to enter internal space 18 of piston 14, whereby grain 20 is blown from hole 19, where it was held under the action of the vacuum, onto tray 24. From tray 24 the grain passes onto the balance pan where it is weighed and then deposited into funnel 25 through which it enters the respective cell on the table.

After the weighed granule is deposited into funnel 25 and pan 10 of balance 2 is loaded with a new granule, beam 11 with the pan and screen 40 moves out of equilibrium, either up thereby preventing the major part of the light rays from reaching the photo element, or down, thus increasing the light flux and hence unbalancing the electronic bridge amplifier 41. The current supplying electric motor 37 will thus flow in one of the two directions.

In the first case electric motor 37 rotates in the direction of unwinding of the torsion spring, thereby lowering beam 11 until equilibrium is obtained, whereas in the second case, said motor rotates in the opposite direction thereby winding the spring and lifting beam 11 up until equilibrium is once again achieved, at which time the bridge system is balanced to zero and the electric motor is stopped. In this way weighing of granules is carried out.

Electric motor 37 rotates table 4 and brings a cell corresponding to the granule being weighed under funnel 25, since shaft 36 of table 4 is coupled to the shaft of balance 2.

At the moment of equilibrium (weighing) when electric motor 37 is stopped, funnel 25 coincides with a cell corresponding to the granule being weighed, said granule being knocked off the balance pan 10 and deposited into this cell. Grading of loose-material granules according to their weight is carried out automatically by multiple repetition of the above described operation. The number of granules in each cell may be counted with a conventional counter connected into the general electric circuit.

What is claimed is:

1. A device for grading granules according to their weight, said device comprising a torsion balance for weighing each granule separately, pneumatic feed means for feeding granules to said torsion balance one-by-one, means for acting on said torsion balance to discharge a granule therefrom after such granule is weighed, a rotatable table positioned beneath the torsion balance for receiving granules therefrom one-by-one, said table having separate compartments therein for the classification of granules according to their weight and means for rotating the table in correspondence with measurement of the weight of a granule in the torsion balance to position that compartment of the table corresponding to the weight of the weighed granule beneath the torsion balance.

2. A device for grading granules according to their weight, said device comprising a torsion balance for weighing each granule separately; pneumatic feed means for feeding granules to the torsion balance one-by-one; means for acting on said torsion balance to discharge a granule therefrom after such granule is weighed; a rotatable table synchronized with said torsion balance for receiving each weighed granule from said balance in a relative angular position related to the weight of the granule in the balance; reversible electric motor means for both turning said torsion balance during weighing of the granules, and for rotating said table in synchronization with the balance in response to the weight of the granule in the balance, and a control device for automatic control comprising means for feeding electric impulses during granule weighing to said reversible electric motor means, to said pneumatic feed means and to the said means which causes discharge of the granules from the balance.

3. A device as claimed in claim 2, wherein said pneumatic feed means comprises a hopper for said granules, a chamber in communication with said hopper for receiving granules therefrom, a hollow piston slidably supported in said chamber, said chamber having an opening adapted for connection with a source of vacuum for displacing the piston in said chamber, said piston having the interior thereof in communication with said vacuum source, said piston having an aperture which opens into said chamber to suck a granule against said piston and convey the same together with said piston in said chamber, said chamber having an opening to atmosphere which is normally blocked by said piston, said piston having an opening which registers with the atmosphere opening in the chamber when the piston has been displaced in the chamber to a limit position whereby the interior of the piston is subjected to atmospheric pressure and the conveyed granule is separated from the piston, and a feeding tray opening into said chamber adjacent said aperture in the piston for receiving the granule when it is separated from the piston to convey said granule to the torsion balance.

4. A device for grading granules according to their weight, said device comprising: a torsional balance for weighing each granule one-by-one, said balance including a pivotal balance pan and a rocker arm supporting the balance pan; a pneumatic feeder for delivery of the granules one-by-one to the balance pan of the said torsional balance and comprising a hopper for loading the granules, a chamber communicating with the hopper to receive the granules, a movable hollow piston in said chamber with its interior subjected to vacuum for conveying the granules one-by-one in said chamber, said chamber having at least two openings, one of which is adapted for being connected with vacuum and the interior of said piston and the other with atmospheric pressure and vacuum, a control valve for connecting the said one opening with vacuum, a guide tray between the said chamber and the said balance pan of the torsional balance for conveying the granules one-by-one from the chamber to said balance pan; a mechanical means for upsetting the pan of the torsional balance to discharge a granule thereon; a turntable synchronized with the said torsional balance to receive the weighed granules one-by-one and assume a particular angular position according to the weight of the granule discharged from the pan of the said balance; a reversible electric motor for effecting both turning of the torsional balance during weighing of the diamond granules and the synchronized rotation of said turntable; an automatic control device comprising a light source, a screen placed in the path of the light source and rigidly connected with said rocker arm of the torsional balance, a photo cell illuminated by said light source, a balancing bridge system of an electronic amplifier for feeding electric impulses to said reversible electric motor, said photo cell being connected to said bridge system to feed a signal thereto in accordance with the amount of light received thereby as a result of the position of the screen as related to the weight of the granule in the balance pan, a time relay engaged at the zero impulse of said bridge system for effecting actuation of the mechanical means at the moment of equilibrium of said torsion balance and simultaneously the activation of the control valve and decoupling of said one opening of the chamber with said vacuum for a limited period of time during the moment of discharge of the granule from the balance pan.

References Cited by the Examiner

UNITED STATES PATENTS

| | | | |
|---|---|---|---|
| 2,790,549 | 4/1957 | Bize | 209—121 |
| 3,106,978 | 10/1963 | Cahn | 177—210 |
| 3,189,178 | 6/1965 | Calleson | 209—121 |

M. HENSON WOOD, JR., *Primary Examiner.*

R. A. SCHACHER, *Assistant Examiner.*